(12) United States Patent
Lee

(10) Patent No.: US 9,242,686 B2
(45) Date of Patent: Jan. 26, 2016

(54) JOINT GUARANTEE SYSTEM FOR VEHICLE ASSEMBLY AND CONTROL METHOD OF THE SAME

(71) Applicant: Hyundai Motor Company, Seoul (KR)

(72) Inventor: Jaehyun Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 213 days.

(21) Appl. No.: 14/107,853

(22) Filed: Dec. 16, 2013

(65) Prior Publication Data
US 2014/0366377 A1    Dec. 18, 2014

(30) Foreign Application Priority Data

Jun. 14, 2013    (KR) .................. 10-2013-0068322

(51) Int. Cl.
*B62D 65/02*    (2006.01)
*B23P 19/06*    (2006.01)
*B25B 21/00*    (2006.01)
*B25B 23/147*    (2006.01)

(52) U.S. Cl.
CPC .............. *B62D 65/02* (2013.01); *B23P 19/06* (2013.01); *B25B 21/00* (2013.01); *B25B 23/147* (2013.01); *Y10T 29/49622* (2015.01); *Y10T 29/53061* (2015.01)

(58) Field of Classification Search
CPC ....................................................... B62D 65/02
USPC .......................................................... 73/432.1
See application file for complete search history.

(56) References Cited

FOREIGN PATENT DOCUMENTS

| JP | 3212993 B2 | 9/2001 |
| JP | 2006-293762 A | 10/2006 |
| KR | 10-2013-0001955 A | 1/2013 |

*Primary Examiner* — Lisa Caputo
*Assistant Examiner* — Jamel Williams
(74) *Attorney, Agent, or Firm* — Morgan, Lewis & Bockius LLP

(57) ABSTRACT

Disclosed is a joint guarantee system for vehicle assembly. The disclosed joint guarantee system for vehicle assembly manages a joining history of a joined component joined to a plurality of join points of a joining target, and includes: i) a tool detecting unit installed at a joining tool for joining the joined component to the joining target, and configured to detect movement displacements and angles of the joining tool for the join points based on a zero point of the joining tool; ii) a tool controller configured to receive a joining completion signal of the joining tool for each join point, and transmit a movement displacement value, an angle value, and a joint value for each join point of the joining tool detected by the tool detecting unit; and iii) a main controller configured to determine joining operation patterns for the join points based on the movement displacement value of the joining tool obtained from the tool controller.

20 Claims, 6 Drawing Sheets

JOINT GUARANTEE SYSTEM FOR VEHICLE ASSEMBLY AND CONTROL METHOD OF THE SAME

CROSS-REFERENCE TO RELATED APPLICATION

The present application claims priority to Korean Patent Application No. 10-2013-0068322 filed on Jun. 14, 2013, the entire contents of which is incorporated herein for all purposes by this reference.

BACKGROUND OF THE INVENTION

1. Field of the Invention

The present invention relates to vehicle assembly system, and more particularly, to a joint guarantee system for vehicle assembly, which is capable of managing a joining history of a component for a vehicle body in an assembly line, in which the component is assembled with the vehicle body, and a control method thereof.

2. Description of Related Art

In general, a vehicle maker assembles tens of thousands of components by a lot of welding and assembly processes within all of the mass production processes until the vehicle is produced.

Particularly, most of the operations performed in an assembly process among production processes for a completed vehicle are a joining process of joining various components to a vehicle body by using a coupling member, such as bolts and nuts.

Since the joining process is directly associated with a quality index of a vehicle, such as durability or silence of a completed vehicle, felt by a consumer, a thorough joining history management of components for the vehicle body is necessary.

However, even though a corresponding business field recognizes significance of the joining history management of the components for the vehicle body, the joining history management having high effectiveness has not been properly performed due to a technical limitation.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a joint guarantee system for vehicle assembly, which precisely recognizes a position of a joining tool for a plurality of join points, thereby promoting a joining history management having high effectiveness, and managing joining histories of adjacent join points, and a control method thereof.

In an aspect of the present invention, a joint guarantee system for vehicle assembly for managing a joining history of a joined component joined to a plurality of join points of a joining target, may include a tool detecting unit installed at a joining tool for joining the joined component to the joining target, and configured to detect movement displacements and angles of the joining tool for the join points based on a zero point of the joining tool, a tool controller configured to receive a joining completion signal of the joining tool for each join point, and transmit a movement displacement value, an angle value, and a joint value for the each join point of the joining tool detected by the tool detecting unit, and a main controller configured to determine joining operation patterns for the join points based on the movement displacement value of the joining tool obtained from the tool controller.

The main controller recognizes a joining operation route corresponding to the joining operation pattern by comparing the joining operation pattern with a plurality of predetermined different joining operation routes.

The main controller sequentially records a joint value of the joining tool for each join point according to the joining operation pattern.

The main controller outputs an alarm for a join point having joining defects when the joint value of the joining tool for each join point does not meet a predetermined reference value.

When a joining completion signal for a first join point is received through the tool controller, the main controller sets the joining completion signal as the zero point of the joining tool.

The tool controller transmits the movement displacement of the joining tool to the main controller until a joining completion signal for each next-order join point is received.

The tool controller transmits the angle value of the joining tool for the each join point to the main controller at a moment at which the tool controller receives the joining completion signal of the joining tool.

The main controller determines whether the each join point may have a joining error by comparing the joining operation pattern and the angle value of the joining tool.

The tool detecting unit may include an acceleration sensor configured to detect an acceleration value of moving three axes according to the movement displacement of the joining tool in real time, and output a detection signal to the tool controller, and an angle sensor configured to detect an angle of the joining tool at the each join point and output a detection signal to the tool controller.

The acceleration sensor and the angle sensor are mounted to the joining tool through a mounting bracket.

In another aspect of the present invention, a method of controlling a joint guarantee system for vehicle assembly, may include providing the joint guarantee system for the vehicle assembly of claim 1 comprising the tool detecting unit, the tool controller, and the main controller, detecting the movement displacements and angles of the joining tool for the join points through the tool detecting unit based on the zero point of the joining tool, and outputting a detection signal to the tool controller, obtaining the movement displacement value, the angle value, and the joint value for the each join point of the joining tool from the tool controller, and determining the joining operation patterns for the join points based on the movement displacement values of the joining tool.

The method may further include detecting an acceleration of moving three axes according to the movement displacements of the joining tool through an acceleration sensor of the tool detecting unit, and detecting an angle of the joining tool by an angle sensor of the tool detecting unit.

The method may further include recognizing a joining operation route corresponding to the joining operation pattern by comparing the joining operation pattern with a plurality of predetermined different joining operation routes.

The method may further include sequentially recording the joint value of the joining tool for the each join point according to the joining operation pattern.

The method may further include transmitting the joint value of the joining tool matched to the each join point to a subsequent repair process.

When the joint value of the joining tool for the each join point does not meet a predetermined reference value in the subsequent repair process, outputting an alarm for a join point having joining defects.

When a joining completion signal for a first join point is received from the tool controller, setting the joining completion signal as a zero point of the joining tool.

The method may further include recording the movement displacement of the joining tool until a joining completion signal for each next-order join point is received from the tool controller.

The method may further include recording an angle value of the joining tool for the each join point at a moment where the joining completion signal of the joining tool is received through the tool controller.

The method may further include determining whether the each join point has a joining error by comparing the joining operation pattern and the angle value of the joining tool.

According to the exemplary embodiments of the present invention, it is possible to promote a joining history management having high effectiveness by precisely recognizing a position of a joining tool for join points, and to manage joining histories of the adjacent join points, thereby improving a quality of a completed vehicle.

Further, according to the exemplary embodiments of the present invention, it is possible to accurately manage the joining history even though an operator does not conform to a designated operation order but performs the operation in an arbitrary order, or performs an operation while getting out of a designated operation position.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The drawings are for reference to describe the exemplary embodiments of the present invention, and it shall not be construed that the technical spirit of the present invention is limited to the accompanying drawings.

Figure 1:
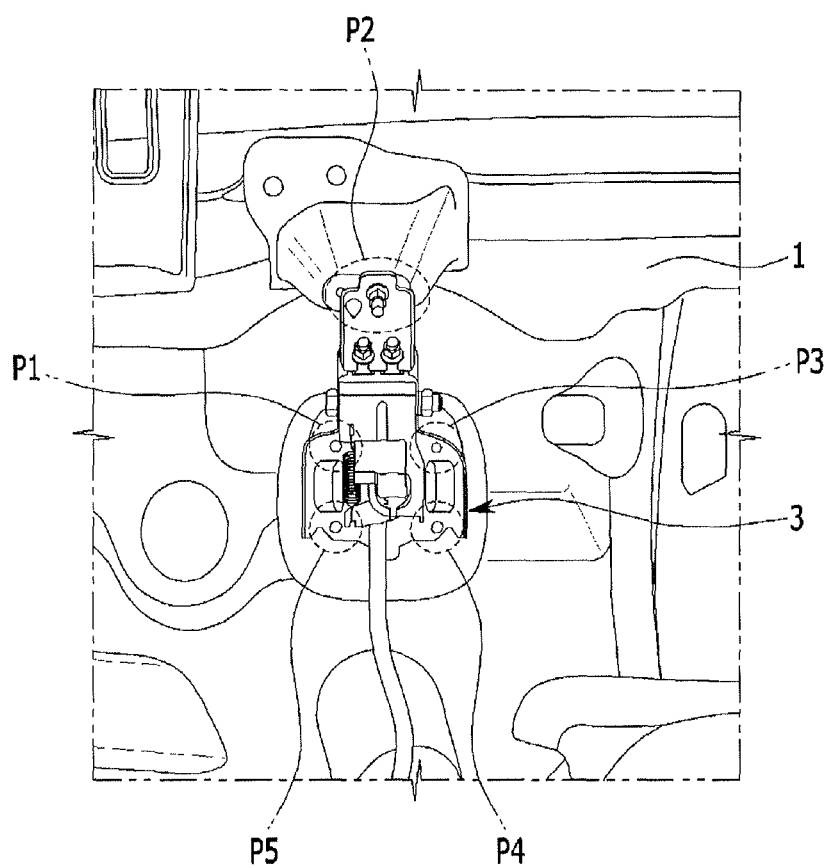
FIG. 1 is a diagram illustrating an example of assembly of a joined component to which a joint guarantee system for vehicle assembly according to an exemplary embodiment of the present invention is applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

A part irrelevant to the description will be omitted to clearly describe the present invention, and the same elements will be designated by the same reference numerals throughout the specification.

The size and thickness of each configuration shown in the drawings are arbitrarily shown for understanding and ease of description, but the present invention is not limited thereto, and the thickness of layers, films, panels, regions, etc., are exaggerated for clarity.

In the following detailed description, names of constituents, which are in the same relationship, are divided into "the first", "the second", and the like, but the present invention is not limited to the order in the following description.

Throughout the specification, unless explicitly described to the contrary, the word "comprise" and variations such as "comprises" or "comprising", will be understood to imply the inclusion of stated elements but not the exclusion of any other elements.

In addition, the terms " . . . unit", " . . . means", " . . . part", and " . . . member" described in the specification mean units of a general configuration performing at least one function or operation.

FIG. 1 is a diagram illustrating an example of assembly of a joined component to which a joint guarantee system for vehicle assembly according to an exemplary embodiment of the present invention is applied.

Referring to FIG. 1, an exemplary embodiment of the present invention may be applied to a vehicle assembling system of a vehicle production process in which a predetermined joined component 3 is joined/assembled to/with a vehicle body 1, which is a joining target, through a joining member.

For example, the exemplary embodiment of the present invention may be applied to joining and assembling the joined component 3, such as a brake pedal, to and with the vehicle body 1 through a coupling member including a bolt and a nut in an assembly process among processes of producing a completed vehicle.

Here, a join portion of the vehicle body 1 and the joined component 3 includes a plurality of join points P1 to Pn requiring different joint angles and joint values.

As an example, in a case where the joined component 3, such as a brake pedal is joined to the vehicle body 1, the join portion of the vehicle body 1 and the joined component 3 includes five join points P1 to P5.

In this case, a first join point P1 among the join points P1 to P5 of the vehicle body 1 and the joined component 3 requires a joint angle of 23 degrees and a predetermined joint value of kgf, and the remaining join points P2 to P5 require a joint angle of 90 degrees and the predetermined joint value of kgf.

Figure 2:
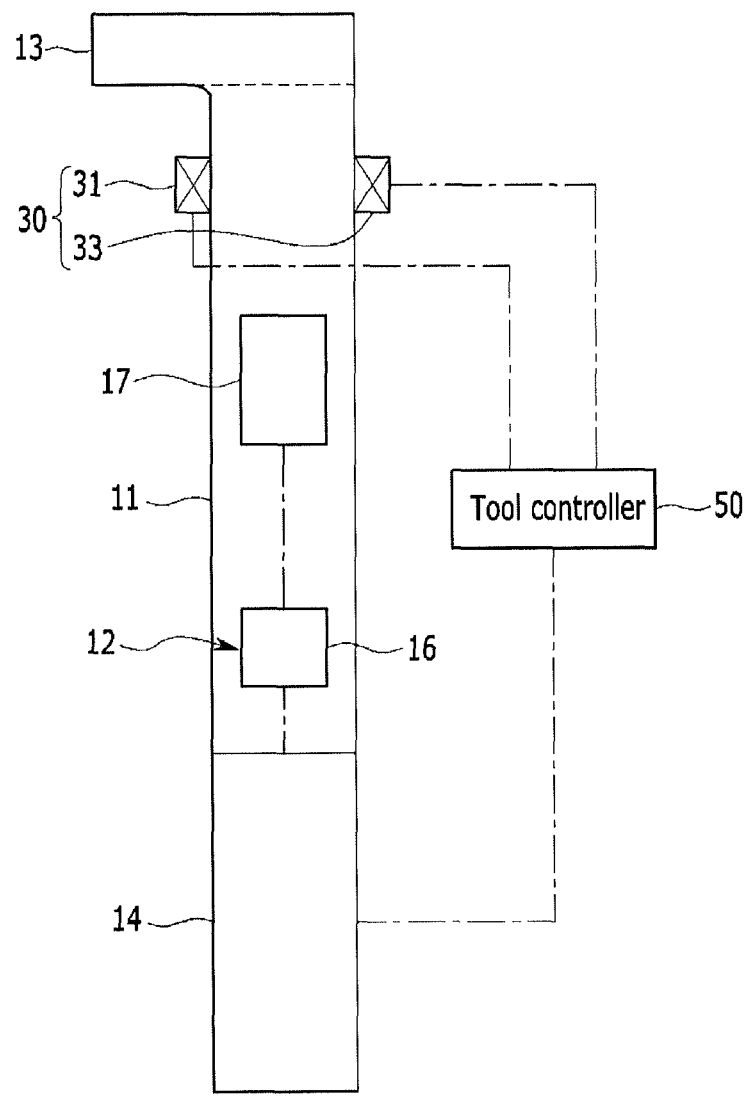
FIG. 2 is a block diagram schematically illustrating a joining tool applied to the joint guarantee system for vehicle assembly according to the exemplary embodiment of the present invention.
Figure 3:
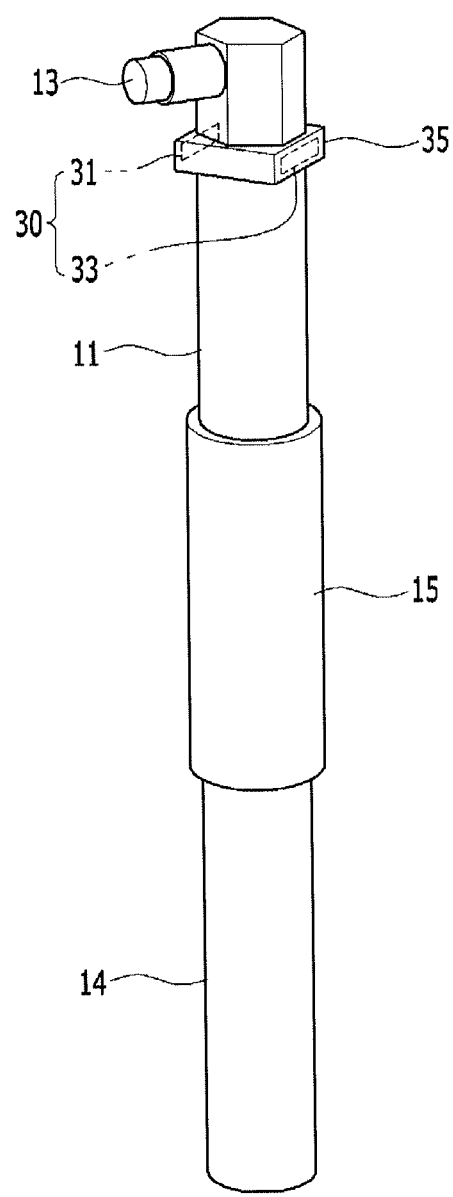
FIG. 3 is a perspective view illustrating a configuration of the joining tool applied to the joint guarantee system for vehicle assembly according to the exemplary embodiment of the present invention.

In the meantime, as illustrated in FIGS. 2 and 3, the exemplary embodiment of the present invention may include a joining tool 10, which is an electric joint mechanism for joining the coupling member, such as the bolt and/or the nut, to the respective join points P1 to P5 (hereinafter, see FIG. 1), which are the join portions of the vehicle body 1 (hereinafter, see FIG. 1), and the joined component 3 (hereinafter, see FIG. 1).

The joining tool 10 includes a tool body 11 and a driving unit 12. The tool body 11 serves as a body of the electric joint mechanism, and a predetermined constituent element may be mounted on the tool body 11.

The tool body 11 may include various attached elements, such as collars, brackets, and support blocks, for supporting predetermined constituent elements.

However, the attached elements are for the purpose of supporting various constituent elements, so that in the exemplary embodiment of the present invention, the attached elements are commonly called the tool body 11 as a principle, except for an exceptional case.

The tool body 11 is formed of a cylindrical body, and the driving unit 12 may be included therein.

Herein, the tool body 11 has one end portion (an upper end portion in the drawing) provided with a joining part 13 for joining the coupling member, such as the bolt and/or the nut, to a predetermined join point.

The joining part 13 includes a socket (not illustrated in the drawing) supporting the joining member, so that the socket may be rotatably installed by the driving unit 12.

Further, a power connection unit 14 for applying power to the driving unit 12 is installed at the other end portion (a lower end portion in the drawing) of the tool body 11. The power connection unit 14 may be joined to the other end portion of the tool body 11 by a female/male connector method.

Further, a grip part 15 for a grip of an operator is installed at an approximately center portion of the tool body 11. The grip part 15 may be formed of rubber or plastic.

The driving unit 12, which serves to provide joining power (rotational force) to the joining part 13, may be electrically connected with the power connection unit 14, may be kinematically connected with the joining part 13, and may be installed inside the tool body 11.

The driving unit 12 includes a motor 16 generating rotational force by an electric signal, and a power transmission part 17 transmitting the rotational force of the motor 16 to the joining part 13.

Here, an example of the power transmission part 17 includes a bevel driving gear and a bevel pinion gear (not illustrated in the drawing) connecting the motor 16 and the joining part 13, and, in addition, may also include various types of gear transmitting the rotational force of the motor 16 to a predetermined rotating body.

The power transmission part 17 is formed of a power transmission unit of a publicly known technique widely known to the corresponding business field, so that a more detailed description of a configuration thereof will be omitted in the present specification.

The aforementioned joint guarantee system 100 for vehicle assembly according to the exemplary embodiment of the present invention, which is applicable to the assembly process of joining the joined component 3 to the vehicle body 1 by using the joining tool 10 is for the purpose of managing a joining history of the joined component 3 joined at the plurality of join points P1 to Pn (for example, P1 to P5) of the vehicle body 1.

That is, the joint guarantee system 100 for vehicle assembly according to the exemplary embodiment of the present invention has a configuration capable of promoting the joining history management having high effectiveness by precisely recognizing a position of the joining tool 10 for the join points P1 to P5, and capable of managing joining histories of the adjacent join points P1 to P5, thereby improving a quality of a completed vehicle.

Further, the exemplary embodiment of the present invention provides the joint guarantee system 100 for vehicle assembly capable of accurately managing the joining history even though the operator does not conform to a designated operation order but performs the operation in an arbitrary order, or performs an operation while getting out of a designated operation position.

Figure 4:
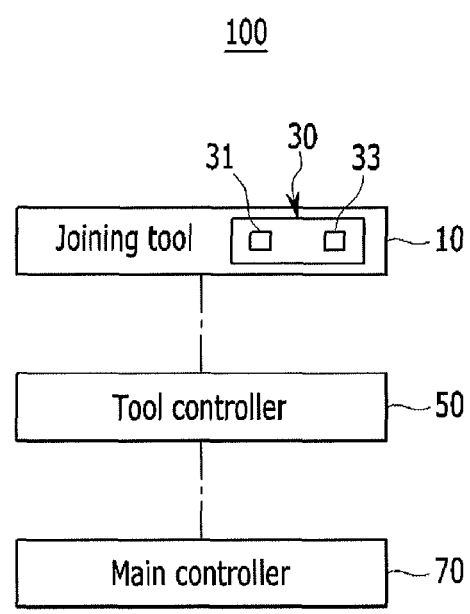
FIG. 4 is a block diagram schematically illustrating a configuration of the joint guarantee system for vehicle assembly according to the exemplary embodiment of the present invention.

FIG. 4 is a block diagram schematically illustrating a configuration of the joint guarantee system for vehicle assembly according to the exemplary embodiment of the present invention.

Referring to FIG. 4 together with FIGS. 1 to 3, the joint guarantee system for vehicle assembly according to the exemplary embodiment of the present invention basically includes a tool detecting unit 30, a tool controller 50, and a main controller 70.

The tool detecting unit 30 is for the purpose of detecting a movement displacement and an angle of the joining tool 10 for the join points P1 to P5 based on a zero point of the joining tool 10, and may be installed at the joining tool 10.

The tool detecting unit 30 includes an acceleration sensor 31 and an angle sensor 33 as illustrated in FIGS. 2 and 3. The acceleration sensor 31 and the angle sensor 33 may be installed at the joining part 13 side of the tool body 11 through a mounting bracket 35.

The acceleration sensor 31 detects acceleration values of moving three axes (x, y, and z) according to a movement displacement of the joining tool 10 in real time when the operator moves while holding the joining tool 10, and outputs a detection signal to the tool controller 50 (hereinafter, see FIG. 4) to be described in detail below.

Further, the angle sensor 33 detects an angle of the joining tool 10 fixed (held) at the respective join points P1 to P5, and outputs a detection signal to the tool controller 50. Here, the angle sensor 33 may include an optical lever-type angle sensor and a polarization type angle sensor measuring an inclination of a predetermined object.

The acceleration sensor 31 and the angle sensor 33 are formed of an acceleration sensor and an angle sensor of a publicly known technique widely known to the corresponding business field, so that detailed descriptions of configurations thereof will be omitted in the present specification.

In the exemplary embodiment of the present invention, the tool controller 50 may receive a joining completion signal of the joining tool 10 for the respective join points P1 to P5, receive the detection signal from the acceleration sensor 31 of the tool detecting unit 30, and calculate movement displacement values for the moving three axes (x, y, and z) of the joining tool 10.

Further, the tool controller 50 may calculate angle values of the joining tool 10 fixed to the respective join points P1 to P5 by receiving the detection signal from the angle sensor 33 of the tool detecting unit 30, and may calculate joint values (torque values) of the joining tool 10 for the respective join points P1 to P5.

Here, the tool controller 50 transmits the movement displacement values, the angle values, and the joint values of the joining tool 10 for the respective join points P1 to P5 to the main controller 70 to be described in detail below.

In this case, the tool controller 50 may transmits the movement displacement of the joining tool 10 detected through the acceleration sensor 31 to the main controller 70 until the joining completion signal for the first join point P1 is received, and the joining completion signals for the next-order join points P2 to Pn are received.

Further, the tool controller 50 may transmit the angle values of the joining tool 10 for the respective join points P1 to P5 to the main controller 70 at a moment at which the tool controller 50 receives the joining completion signal of the joining tool 10.

In the exemplary embodiment of the present invention, the main controller 70 is also generally called "a control center" in the corresponding business field, and controls a general operation of the system 100.

The main controller 70 may determine a joining operation pattern for the join points P1 to P5 based on the movement displacement value of the joining tool 10 obtained from the tool controller 50.

That is, when the tool controller 50 receives the joining completion signal for the first join point P1, the main controller 70 sets the joining completion signal as the zero point ( 0, 0, 0) of the joining tool 10.

Further, the main controller 70 obtains the movement displacement value of the joining tool 10 from the tool controller 50 until the tool controller 50 receives the joining completion signals for the next-ordered join points P2 to Pn.

Accordingly, when all of relative coordinates of joining positions of the respective join points P1 to P5 are determined as described above, the main controller 70 according to the exemplary embodiment of the present invention may determine the joining operation pattern based on the determined relative coordinates.

In the meantime, the main controller 70 recognizes a joining operation route corresponding to the joining operation pattern by comparing the aforementioned joining operation pattern and a plurality of predetermined different joining operation routes, and sequentially records the joint values of the joining tool 10 for the respective join points P1 to P5 according to the joining operation pattern.

The joint values of the joining tool 10 recorded in the main controller 70 while being matched to the respective join points P1 to P5 may be transmitted to a subsequent repair process through the main controller 70.

When the joint value of the joining tool 10 for each join point P1 to P5 does not meet a predetermined reference value in the subsequent repair process, the main controller 70 may output an alarm for the join point having joining defects.

Further, the main controller 70 may determine whether each join point P1 to P5 has a joining error by comparing the joining operation pattern with the angle value of the joining tool 10.

In addition, in the exemplary embodiment of the present invention, at a moment where the joining operations for the respective join points P1 to P5 are completed, the angle of the joining tool 10 is measured through the angle sensor 33, and the angle values are transmitted to the main controller 70 through the tool controller 50.

Accordingly, the main controller 70 determines whether each join point P1 to P5 has the joining error by comparing the set joining operation pattern with the angle value of the joining tool 10 through the acceleration sensor 31.

For example, in a case where an angle of the joining tool at the first join point P1 among the join points P1 to P5 of the vehicle body 1 and the joined component 3 is 23 degrees, and the angles of the joining tool of the remaining join points P2 to P5 are 90 degrees, when the angle value of the first join point P1 is 90 degrees, the main controller 70 determines that the first join point P1 has the joining error.

Hereinafter, a control method of the joint guarantee system 100 for vehicle assembly according to the exemplary embodiment of the present invention having the aforementioned configuration will be described in detail with reference to the previously disclosed drawings and the accompanying drawings.

Figure 5:
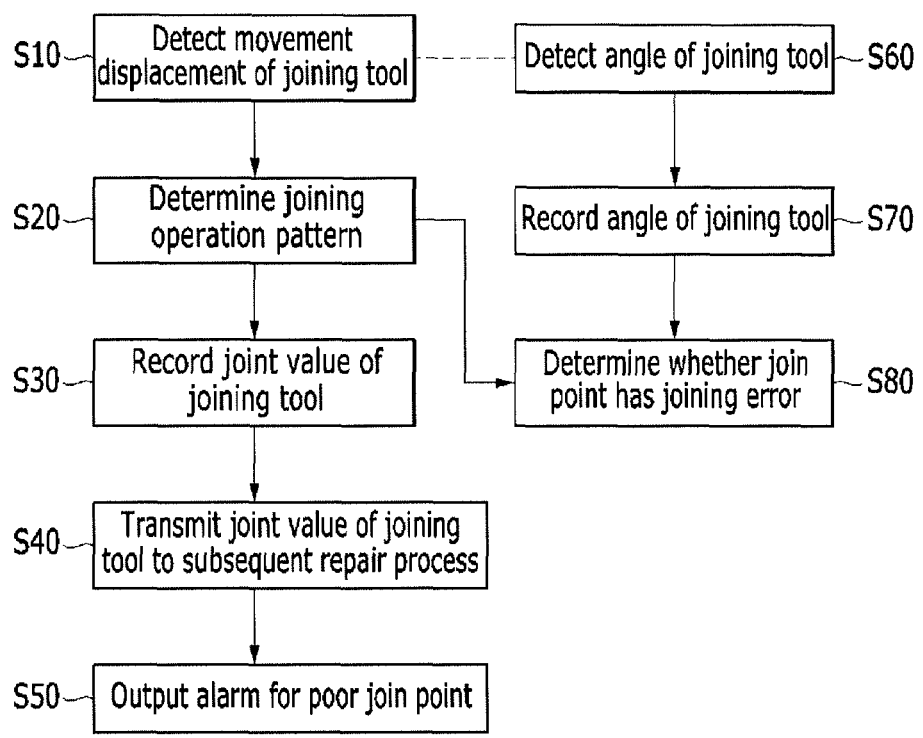
FIG. 5 is a flowchart for describing a control method of the joint guarantee system for vehicle assembly according to the exemplary embodiment of the present invention.

FIG. 5 is a flowchart for describing the control method of the joint guarantee system for vehicle assembly according to the exemplary embodiment of the present invention.

Referring to the previously disclosed drawings and FIG. 5, the exemplary embodiment of the present invention provides the joint guarantee system 100 for vehicle assembly including the tool detecting unit 30, the tool controller 50, and the main controller 70 as described above.

First, in the control method of the joint guarantee system 100 for vehicle assembly according to the exemplary embodiment of the present invention, a movement displacement of the joining tool 10 for each join point P1 to P5 is detected through the acceleration sensor 31 of the tool detecting unit 30, and the detection signal is output to the tool controller 50 (step S10).

Then, the main controller 70 obtains the movement displacement value of the joining tool 10 for each join point P1 to P5 from the tool controller 50, and determines joining operation patterns for the join points P1 to P5 based on the movement displacement values of the joining tool 10 (step S20).

Figure 6:
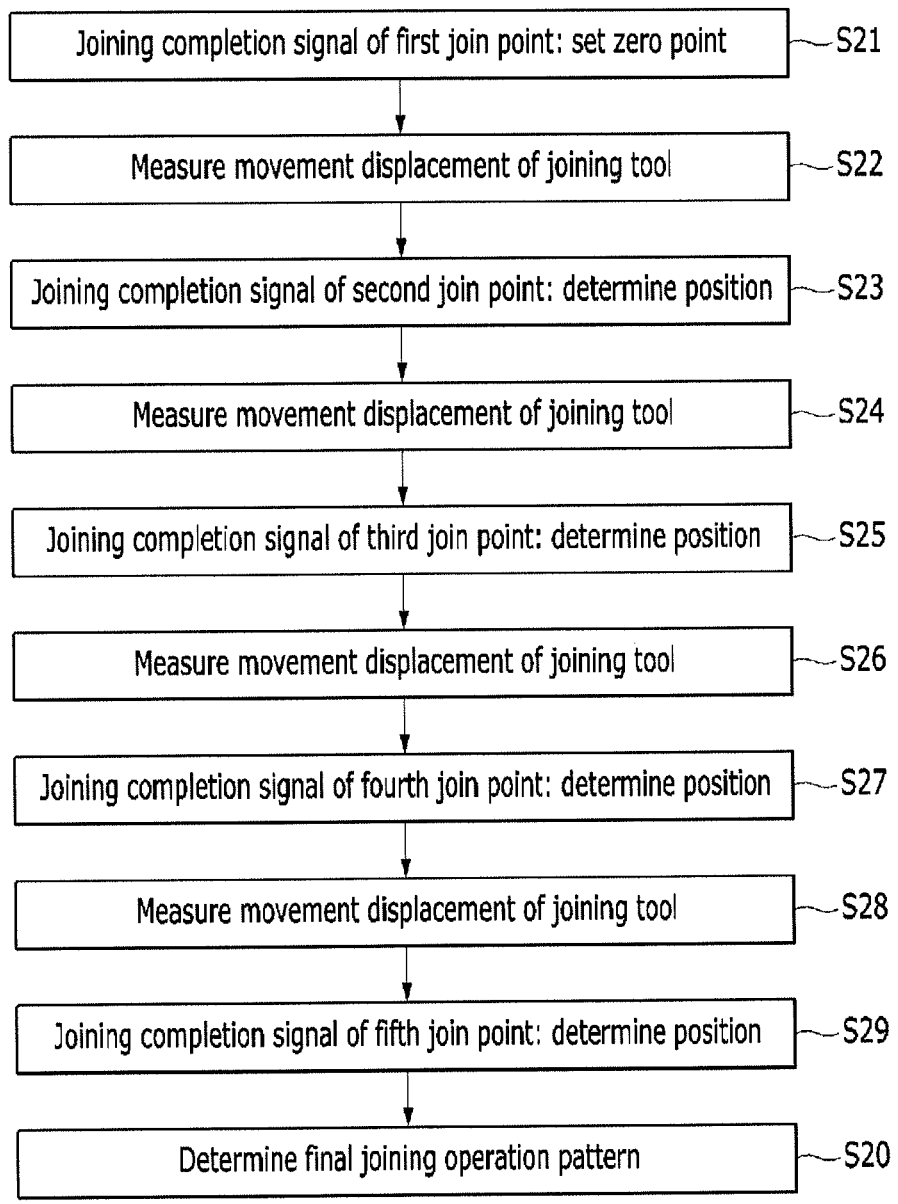
FIG. 6 is a flowchart for describing a process of determining a joining operation pattern of a joined component in the control method of the joint guarantee system for vehicle assembly according to the exemplary embodiment of the present invention.

The process of determining the joining operation pattern for each join point P1 to P5 (step S20) will be described with reference to FIG. 6. When a predetermined joining completion signal for the first join point P1 is received in the tool controller 50, the joining completion signal is set as a zero point (0, 0, 0) of the joining tool 10 (step S21).

Then, the main controller 70 obtains a movement displacement value of the joining tool 10 for the second join point P2 (step S22), and when a joining completion signal for the second join point P2 is received in the tool controller 50, the main controller 70 determines a coordinate of a joining position for the second join point P2 (step S23).

Then, the main controller 70 obtains a movement displacement value of the joining tool 10 for the third join point P3 (step S24), and when a joining completion signal for the third join point P3 is received, the main controller 70 determines a coordinate of a joining position for the third join point P3 (step S25).

Accordingly, in the exemplary embodiment of the present invention, the main controller 70 obtains movement displacement values of the joining tool 10 for the fourth and fifth join points P4 and P5 by repeating the aforementioned process, and when joining completion signals for the fourth and fifth join points P4 and P5 are received in the tool controller 50, the main controller 70 determines coordinates of joining positions for the fourth and fifth join points P4 and P5 (steps S26 to S29).

Accordingly, in the exemplary embodiment of the present invention, when all of the relative coordinates of the joining positions for the respective join points P1 to P5 are determined as described above, the joining operation pattern for each join point P1 to P5 may be determined based on the determined relative coordinates (step S20).

In the meantime, when the joining operation patterns for the respective join points P1 to P5 are determined, in the exemplary embodiment of the present invention, the main controller 70 recognizes a joining operation route corresponding to the joining operation pattern by comparing the joining operation patterns and a plurality of predetermined different joining operation routes.

Then, as illustrated in FIG. 5, the main controller 70 sequentially records a joint value of the joining tool 10 for each join point P1 to P5 according to the joining operation pattern (step S30), and transmits the joint value of the joining tool 10 matched to each join point P1 to P5 to a subsequent repair process (step S40).

Then, when the joint value of the joining tool 10 for each join point P1 to P5 does not meet a predetermined reference value in the subsequent repair process, the main controller 70 outputs an alarm for the join point having joining defects (step S50).

Then, an operator may identify the join point having the joining defects through the alarm, and perform a repair operation on the join point.

In the other hand, in the exemplary embodiment of the present invention, at the moment where the joining completion signal of the joining tool 10 is received through the tool controller 50, the main controller 70 detects an angle of the joining tool 10 for each join point P1 to P5 through the angle sensor 33 of the tool detecting unit 30, and outputs the detection signal to the tool controller 50 (step S60).

Then, the main controller 70 records the angle value of the joining tool 10 for each join point P1 to P5 received from the tool controller 50 (step S70), and determines whether each join point P1 to P5 has a joining error by comparing the joining operation pattern and the angle value of the joining tool 10 (step S80).

As described above, according to the joint guarantee system 100 for vehicle assembly according to the exemplary embodiment of the present invention, and the control method thereof, it is possible to promote a joining history management having high effectiveness by precisely recognizing the position of the joining tool 10 for each join point P1 to P5, and it is possible to manage joining histories of the adjacent join points P1 to P5, thereby improving a quality of a completed vehicle.

Further, in the exemplary embodiment of the present invention, it is possible to accurately manage the joining history even though the operator does not conform to a designated operation order but performs the operation in an arbitrary order, or performs an operation while getting out of a designated operation position.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed:

1. A joint guarantee system for vehicle assembly for managing a joining history of a joined component joined to a plurality of join points of a joining target, the joint guarantee system comprising:
   a tool detecting unit installed at a joining tool for joining the joined component to the joining target, and configured to detect movement displacements and angles of the joining tool for the join points based on a zero point of the joining tool;
   a tool controller configured to receive a joining completion signal of the joining tool for each join point, and transmit a movement displacement value, an angle value, and a joint value for the each join point of the joining tool detected by the tool detecting unit; and
   a main controller configured to determine joining operation patterns for the join points based on the movement displacement value of the joining tool obtained from the tool controller.

2. The joint guarantee system of claim 1, wherein the main controller recognizes a joining operation route corresponding to the joining operation pattern by comparing the joining operation pattern with a plurality of predetermined different joining operation routes.

3. The joint guarantee system of claim 2, wherein the main controller sequentially records a joint value of the joining tool for each join point according to the joining operation pattern.

4. The joint guarantee system of claim 1, wherein the main controller outputs an alarm for a join point having joining defects when the joint value of the joining tool for each join point does not meet a predetermined reference value.

5. The joint guarantee system of claim 1, wherein when a joining completion signal for a first join point is received through the tool controller, the main controller sets the joining completion signal as the zero point of the joining tool.

6. The joint guarantee system of claim 5, wherein the tool controller transmits the movement displacement of the joining tool to the main controller until a joining completion signal for each next-order join point is received.

7. The joint guarantee system of claim 1, wherein the tool controller transmits the angle value of the joining tool for the each join point to the main controller at a moment at which the tool controller receives the joining completion signal of the joining tool.

8. The joint guarantee system of claim 7, wherein the main controller determines whether the each join point has a joining error by comparing the joining operation pattern and the angle value of the joining tool.

9. The joint guarantee system of claim 1, wherein the tool detecting unit includes:
   an acceleration sensor configured to detect an acceleration value of moving three axes according to the movement displacement of the joining tool in real time, and output a detection signal to the tool controller, and an angle sensor configured to detect an angle of the joining tool at the each join point and output a detection signal to the tool controller.

10. The joint guarantee system of claim 9, wherein the acceleration sensor and the angle sensor are mounted to the joining tool through a mounting bracket.

11. A method of controlling a joint guarantee system for vehicle assembly, comprising:

providing the joint guarantee system for the vehicle assembly of claim 1 comprising the tool detecting unit, the tool controller, and the main controller;

detecting the movement displacements and angles of the joining tool for the join points through the tool detecting unit based on the zero point of the joining tool, and outputting a detection signal to the tool controller;

obtaining the movement displacement value, the angle value, and the joint value for the each join point of the joining tool from the tool controller; and determining the joining operation patterns for the join points based on the movement displacement values of the joining tool.

12. The method of claim 11, further comprising:

detecting an acceleration of moving three axes according to the movement displacements of the joining tool through an acceleration sensor of the tool detecting unit; and detecting an angle of the joining tool by an angle sensor of the tool detecting unit.

13. The method of claim 11, further comprising:

recognizing a joining operation route corresponding to the joining operation pattern by comparing the joining operation pattern with a plurality of predetermined different joining operation routes.

14. The method of claim 13, further comprising:

sequentially recording the joint value of the joining tool for the each join point according to the joining operation pattern.

15. The method of claim 14, further comprising:

transmitting the joint value of the joining tool matched to the each join point to a subsequent repair process.

16. The method of claim 15, further comprising:

when the joint value of the joining tool for the each join point does not meet a predetermined reference value in the subsequent repair process, outputting an alarm for a join point having joining defects.

17. The method of claim 11, further comprising:

when a joining completion signal for a first join point is received from the tool controller, setting the joining completion signal as a zero point of the joining tool.

18. The method of claim 17, further comprising:

recording the movement displacement of the joining tool until a joining completion signal for each next-order join point is received from the tool controller.

19. The method of claim 11, further comprising:

recording an angle value of the joining tool for the each join point at a moment where the joining completion signal of the joining tool is received through the tool controller.

20. The method of claim 19, further comprising:

determining whether the each join point has a joining error by comparing the joining operation pattern and the angle value of the joining tool.

\* \* \* \* \*